United States Patent
Hong et al.

(10) Patent No.: US 9,745,499 B2
(45) Date of Patent: Aug. 29, 2017

(54) HEXAGONAL BORON NITRIDE NANOSHEET/CERAMIC NANOCOMPOSITE POWDER AND PRODUCING METHOD OF THE SAME, AND HEXAGONAL BORON NITRIDE NANOSHEET/CERAMIC NANOCOMPOSITE MATERIALS AND PRODUCING METHOD OF THE SAME

(71) Applicant: Korea Advanced Institute of Science and Technology, Daejeon (KR)

(72) Inventors: Soonhyung Hong, Daejeon (KR); Bin Lee, Daejeon (KR); Dongju Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/478,525

(22) Filed: Sep. 5, 2014

(65) Prior Publication Data

US 2015/0069288 A1    Mar. 12, 2015

(30) Foreign Application Priority Data

Sep. 6, 2013  (KR) ......................... 10-2013-0107078
Sep. 5, 2014  (KR) ......................... 10-2014-0118328

(51) Int. Cl.
*B32B 5/16* (2006.01)
*B32B 9/00* (2006.01)
(Continued)

(52) U.S. Cl.
CPC ............ *C09K 5/14* (2013.01); *C01B 21/0648* (2013.01); *C01P 2002/82* (2013.01); *C01P 2004/03* (2013.01); *C01P 2004/04* (2013.01); *C01P 2004/24* (2013.01); *Y10T 428/2982* (2015.01); *Y10T 428/2993* (2015.01)

(58) Field of Classification Search
CPC .......... C09K 5/14; C01B 21/06; C01B 21/064
USPC ................... 252/71; 264/117, 140, 442, 681; 428/402, 404

See application file for complete search history.

(56) References Cited

U.S. PATENT DOCUMENTS 4,624,298 A * 11/1986 Rudolph et al. .............. 164/486
8,258,346 B2 * 9/2012 Rajendran ............. C07C 211/46
                                                    428/195.1

(Continued)

FOREIGN PATENT DOCUMENTS

KR      1020130014327 A      2/2013

OTHER PUBLICATIONS

Luke S. Walker et al., "Toughening in graphene ceramic composites", ACS Nano, vol. 5, No. 4, (2011), 3182-3190.
(Continued)

*Primary Examiner* — Jane L Stanley
(74) *Attorney, Agent, or Firm* — Brundidge & Stanger, P.C.

(57) ABSTRACT

The present disclosure relates to hexagonal boron nitride nanosheet/ceramic nanocomposite powder including surface-modified hexagonal boron nitride nanosheets which serve as a reinforcing agent for the matrix ceramic, and a method for producing the same, and a hexagonal boron nitride nanosheet/ceramic nanocomposite material including the hexagonal boron nitride nanosheet/ceramic nanocomposite powder and a method for producing the same.

8 Claims, 12 Drawing Sheets

(51) Int. Cl.
　　　C09K 5/00　　　　(2006.01)
　　　C09C 1/56　　　　(2006.01)
　　　C09K 5/14　　　　(2006.01)
　　　C01B 21/064　　　(2006.01)

(56) References Cited

U.S. PATENT DOCUMENTS

| | | | |
|---|---|---|---|
| 2003/0073769 A1* | 4/2003 | Pujari et al. | 524/404 |
| 2006/0154800 A1* | 7/2006 | Chen | 501/92 |
| 2007/0265379 A1* | 11/2007 | Chen et al. | 524/404 |
| 2008/0153960 A1* | 6/2008 | Meneghetti et al. | 524/404 |
| 2011/0045223 A1* | 2/2011 | Lin et al. | 428/36.9 |

OTHER PUBLICATIONS

Chunguang Yue et al., "Fracture toughness and toughening mechanisms in a (ZrB2—SiC) composite reinforced with boron nitride nanotubes and boron nitride nanoplatelets", Scripta Materialia, vol. 68, (2013), 579-582.

* cited by examiner

HEXAGONAL BORON NITRIDE NANOSHEET/CERAMIC NANOCOMPOSITE POWDER AND PRODUCING METHOD OF THE SAME, AND HEXAGONAL BORON NITRIDE NANOSHEET/CERAMIC NANOCOMPOSITE MATERIALS AND PRODUCING METHOD OF THE SAME

CROSS-REFERENCE TO RELATED APPLICATION

This application claims the benefit of Korean Patent Applications No. 10-2013-0107078 filed on Sep. 6, 2013 and 10-2014-0118328 filed on Sep. 5, 2014, the entire disclosures of which are incorporated herein by reference.

FIELD OF THE INVENTION

The present disclosure relates to hexagonal boron nitride nanosheet/ceramic nanocomposite powder and a producing method of the same, and a hexagonal boron nitride nanosheet/ceramic nanocomposite material and a producing method of the same.

BACKGROUND OF THE INVENTION

Ceramic is widely used in various fields such as various devices for home appliances, substrates for integrated circuits, condensers, heat-resistant tiles of space shuttles, artificial teeth, and bones by virtue of its unique strength, hardness, and chemical stability.

Recently, as a miniaturized and high-performance electronic equipment is developed, improvement of mechanical properties and thermal conductivity of ceramic materials useful as materials for substrates has been demanded. Many researches for improving the physical properties of the ceramic materials have been conducted since the mid 1900s. In recent, there have been active attempts for integration with nanotechnologies.

As nano-additives that have been commonly used for the ceramic materials, there are carbon fibers, carbon nanotubes, graphenes, and others which have been recently spotlighted. The article "Toughening in graphene ceramic composites," Luke S. Walker, et al., ACS NANO, Vol. 5, No. 4, (2011), 3182-3190 disclosed to produce composite materials through discharge plasma sintering after homogeneously mixing silicon nitride powder and graphene oxides through ultrasonification, to provide silicon nitride nanocomposite materials having improved toughness.

However, although carbon-based nanomaterials such as carbon nanotubes and graphenes have superior mechanical, thermal and electrical properties, their properties are weak to a high temperature. Due to this disadvantage, the carbon-based nanomaterials are not suitable for reinforcing agents of high temperature materials. To the contrary, a hexagonal boron nitride nanosheet that has been recently researched has similar mechanical and thermal properties to those of graphenes, while maintaining its properties even at a high temperature. Thus, the hexagonal boron nitride nanosheet is highly expected to be used as a ceramic composite material reinforcing agent.

From the article "Fracture toughness and toughening mechanisms in a ($ZrB_2$—SiC) composite reinforced with boron nitride nanotubes and boron nitride nanoplatelets," Chunguang Yue, et. al., Scripta Materialia, Vol 68, (2013), 579-582, it has been confirmed that the toughness of the ceramic composite material is increased by compositing a boron nitride nanotube and a boron nitride nanosheet with a boron zirconium-silicon carbide composite material through a ball-milling. However, since the simple mixing method through the ball-milling may cause aggregation of nanomaterials having a large aspect ratio, it may restrict the improvement in the properties of the composite material. Thus, a new technology, which can homogeneously disperse boron nitride nanosheets in composite materials, has been needed.

BRIEF SUMMARY OF THE INVENTION

The present disclosure provides hexagonal boron nitride nanosheet/ceramic nanocomposite powder including surface-modified hexagonal boron nitride nanosheets, which are dispersed in a matrix ceramic and serve as a reinforcing agent for the matrix ceramic, and a method for producing the same.

In addition, the present disclosure provides a hexagonal boron nitride nanosheet/ceramic nanocomposite material including the hexagonal boron nitride nanosheet/ceramic nanocomposite powder, and a method for producing the same.

However, the technical problems, which are sought to be solved by the present disclosure, are not limited to those described above. Other technical problems, which are sought to be solved by the present disclosure but are not described in this document, can be clearly understood by one of ordinary skill in the art from the descriptions below.

Means for Solving the Problems

A first aspect of the present disclosure provides hexagonal boron nitride nanosheet/ceramic nanocomposite powder including surface-modified hexagonal boron nitride nanosheets dispersed in a matrix ceramic.

A second aspect of the present disclosure provides a hexagonal boron nitride nanosheet/ceramic nanocomposite material formed by using the hexagonal boron nitride nanosheet/ceramic nanocomposite powder according to the first aspect of the present disclosure.

A third aspect of the present disclosure provides a method for producing hexagonal boron nitride nanosheet/ceramic nanocomposite powder, including modifying a surface of a hexagonal boron nitride nanosheet by covalent or non-covalent functionalization of the surface of the hexagonal boron nitride nanosheet; adding powder of a matrix ceramic in a solvent in which the hexagonal boron nitride nanosheets are dispersed, to be dispersed therein; and removing the solvent.

A fourth aspect of the present disclosure provides a method for producing a hexagonal boron nitride nanosheet/ceramic nanocomposite material, including sintering the hexagonal boron nitride nanosheet/ceramic nanocomposite powder produced by the method according to the third aspect of the present disclosure.

Effect of the Invention

According to the present disclosure, since the surface-modified hexagonal boron nitride nanosheets are homogeneously formed between ceramic particles of the matrix ceramic, the mechanical and thermal properties of the matrix ceramic can be improved. The conventional simple mixing process may cause aggregation of the boron nitride nanosheets, and thus, restrict the improvement of the properties. However, according to the means of the present disclosure for solving the problems, it is possible to produce homogeneously dispersed hexagonal boron nitride nanosheet/ceramic nanocomposite powder.

In addition, it is possible to easily produce the hexagonal boron nitride nanosheet/ceramic nanocomposite powder of the present disclosure, which has reinforced mechanical and thermal properties, and the hexagonal boron nitride nanosheet/ceramic nanocomposite material by using the hexagonal boron nitride nanosheet/ceramic nanocomposite powder through simple processes.

BRIEF DESCRIPTION OF THE DRAWINGS

Non-limiting and non-exhaustive embodiments of the present disclosure will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Figure 1:
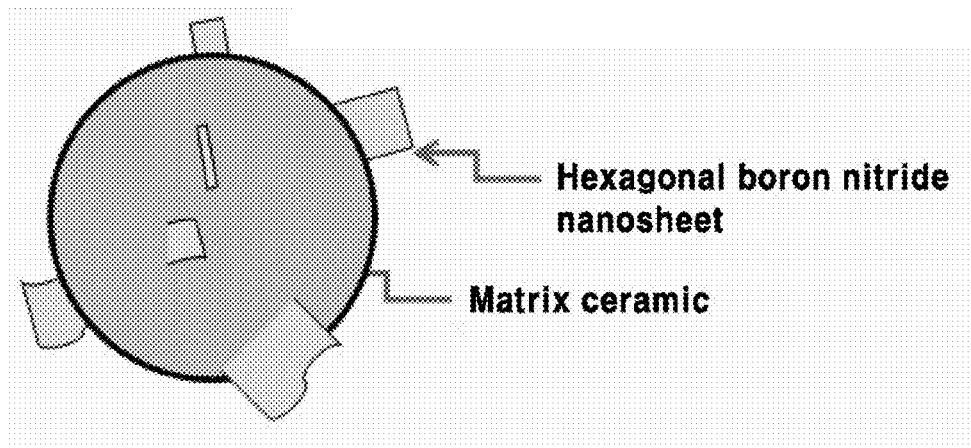
FIG. 1 is a schematic view showing a structure of hexagonal boron nitride nanosheet/ceramic nanocomposite powder in accordance with an illustrative embodiment of the present disclosure.

Hereinafter, illustrative embodiments and examples of the present disclosure will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the present disclosure, the terms "connected to" or "coupled to" are used to designate a connection or coupling of one element to another element and include both a case where an element is "directly connected or coupled to" another element and a case where an element is "electronically connected or coupled to" another element via still another element.

Throughout the present disclosure, the term "on" that is used to designate a position of one element with respect to another element includes both a case that the one element is adjacent to the another element and a case that any other element exists between these two elements.

Throughout the present disclosure, the term "comprises or includes" and/or "comprising or including" used in the document means that one or more other components, steps, operations, and/or the existence or addition of elements are not excluded in addition to the described components, steps, operations and/or elements. The terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Through the present disclosure, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the present disclosure, the description of "A and/or B" means "A or B, or A and B."

The "hexagonal boron nitride" described throughout the present disclosure means a mono-layer or multi-layer material having the chemical formula of BN (boron nitride) and has almost the same crystalline structure to that of graphite.

The term "ceramic" used throughout the present disclosure means non-metallic inorganic solid produced by heating and cooling. The ceramic material may be of a crystalline or partially crystalline structure, or amorphous. However, in most cases, the ceramic is crystalline and may be limited to an inorganic crystalline material.

The terms "hexagonal boron nitride nanosheet (BNNS)/ceramic nanocomposite powder" used throughout the present disclosure mean nano-sized composite powder, which has the above-described ceramic as a matrix ceramic, and in which a hexagonal boron nitride nanosheets are dispersed within the matrix ceramic. For example, "hexagonal boron nitride nanosheet/alumina nanocomposite powder" means a nano-sized composite material, which has alumina as a matrix ceramic, and in which hexagonal boron nitride nanosheets are dispersed within the matrix ceramic. The "nano-sized" means a diameter, length, height, or width of less than about 1 μm. The terms "matrix ceramic" are used to commonly indicate various types of ceramic, which function as a matrix of powder.

Hereinafter, illustrative embodiments and examples of the present disclosure will be described in detail with reference to the accompanying drawings. However, the present disclosure may not be limited to the illustrative embodiments, the examples, and the drawings.

A first aspect of the present disclosure provides hexagonal boron nitride nanosheet/ceramic nanocomposite powder including surface-modified hexagonal boron nitride nanosheets dispersed in a matrix ceramic.

In accordance with an illustrative embodiment of the present disclosure, the surface-modified hexagonal boron nitride nanosheets may be dispersed in a matrix ceramic and serve as a reinforcing agent for the matrix ceramic, but may not be limited thereto.

FIG. 1 is a schematic view showing a structure of hexagonal boron nitride nanosheet/ceramic nanocomposite powder in accordance with an illustrative embodiment of the present disclosure. As illustrated in FIG. 1, the hexagonal boron nitride nanosheet in accordance with an illustrative embodiment of the present disclosure may be in a form of a thin film between ceramic particles in the matrix ceramic or on a surface of the matrix ceramic to be bonded to the ceramic particles, and thus, serve as a reinforcing agent improving mechanical properties such as hardness, toughness, and flexural rigidity, or thermal conductivity of the matrix ceramic, but may not be limited thereto.

In accordance with an illustrative embodiment of the present disclosure, the surface-modified hexagonal boron nitride nanosheet may be formed by covalent or non-covalent functionalization of the surface of the hexagonal boron nitride nanosheet, but may not be limited thereto.

In accordance with an illustrative embodiment of the present disclosure, the hexagonal boron nitride nanosheet may be in a mono-layer or multi-layer form of hexagonal boron nitride. For example, the hexagonal boron nitride nanosheet may be a film having a thickness of about 100 nm or less, but may not be limited thereto. For example, the hexagonal boron nitride nanosheet may be a film having a thickness of about 100 nm or less, about 90 nm or less, about 80 nm or less, about 70 nm or less, about 60 nm or less, about 50 nm or less, about 40 nm or less, about 30 nm or less, about 20 nm or less, or about 10 nm or less, but may not be limited thereto. In addition, the hexagonal boron nitride nanosheet may have a size of from about 0.1 nm to about 10 μm, but may not be limited thereto. For example, the hexagonal boron nitride nanosheet may have a size of from about 0.1 nm to about 10 μm, from about 1 nm to about 10 μm, from about 10 nm to about 10 μm, from about 100 nm to about 10 μm, from about 500 nm to about 10 μm, from about 1 μm to about 10 μm, from about 0.1 nm to about 1 μm, from about 1 nm to about 1 μm, from about 10 nm to about 1 μm, from about 100 nm to about 1 μm, from about 500 nm to about 1 μm, from about 0.1 nm to about 500 nm, from about 1 nm to about 500 nm, from about 10 nm to about 500 nm, from about 100 nm to about 500 nm, from about 0.1 nm to about 100 nm, from about 1 nm to about 100 nm, from about 10 nm to about 100 nm, from about 0.1 nm to about 10 nm, from about 1 nm to about 10 nm, or from about 0.1 nm to about 1 nm, but may not be limited thereto.

In accordance with an illustrative embodiment of the present disclosure, the matrix ceramic may include an inorganic material selected from the group consisting of oxides, carbides, nitrides, borides, and combinations thereof, but may not be limited thereto. For example, if the matrix ceramic is oxide, it may include at least a member selected from the group consisting of $Al_2O_3$, $SiO_2$, $TiO_2$, $ZrO_2$, $Ta_2O_5$, MgO, BeO, $BaTiO_3$, ZnO, BaO, $CrO_2$, $Y_2O_3$, $SnO_2$, $WO_2$, $W_2O_3$, $WO_3$, and combinations thereof, but may not be limited thereto. For example, if the matrix ceramic is carbide, it may include a member selected from the group consisting of SiC, TiC, ZrC, HfC, VC, NbC, TaC, $Mo_2C$, WC, yttrium carbide, and combinations thereof, but may not be limited thereto. For example, if the matrix ceramic is nitride, it may include a member selected from the group consisting of TiN, ZrN, HfN, VN, NbN, TaN, AlN, AlON, $Si_3N_4$, yttrium nitride, and combinations thereof, but may not be limited thereto. For example, if the matrix ceramic is boride, it may include a member selected from the group consisting of $TiB_2$, $ZrB_2$, $HfB_2$, $VB_2$, $NbB_2$, $TaB_2$, $WB_2$, $MoB_2$, $B_4C$, $LaB_6$, and combinations thereof, but may not be limited thereto.

In accordance with an illustrative embodiment of the present disclosure, an amount of the hexagonal boron nitride nanosheets dispersed in the matrix ceramic may be from above about 0 vol % to about 50 vol % or less, which is the limit that can prevent transformation of the structure of the hexagonal boron nitride nanosheet and the matrix ceramic resulting from mutual reaction of the hexagonal boron nitride nanosheets, but may not be limited thereto. For example, if the amount of the hexagonal boron nitride nanosheets dispersed in the matrix ceramic exceeds about 50 vol %, the structure of the hexagonal boron nitride nanosheets may be transformed into hexagonal boron nitride due to condensation of the hexagonal boron nitride nanosheets caused by mutual reaction of the hexagonal boron nitride nanosheets. It is regarded that the transformation of the structure of the hexagonal boron nitride nanosheets would deteriorate the function of the hexagonal boron nitride nanosheets to improve the mechanical properties of the matrix ceramic. Accordingly, the amount of the hexagonal boron nitride nanosheets dispersed in the matrix ceramic needs to be properly controlled, and the hexagonal boron nitride nanosheets in the matrix ceramic may be controlled to be in an amount of from above about 0 vol % to about 50 vol % or less, but may not be limited thereto. For example, the amount of the hexagonal boron nitride nanosheets dispersed within the matrix ceramic may be about 50 vol % or less, about 45 vol % or less, about 40 vol % or less, about 35 vol % or less, about 30 vol % or less, about 25 vol % or less, about 20 vol % or less, about 15 vol % or less, about 10 vol % or less, about 5 vol % or less, or about 1 vol % or less, but may not be limited thereto.

In accordance with an illustrative embodiment of the present disclosure, for the matrix ceramic, various types of ceramic in a form of powder can be applied, and ceramic particles within the matrix ceramic may have a size of from a few nanometers to tens of micrometers or less. In accordance with an illustrative embodiment of the present disclosure, the ceramic particles in the matrix ceramic may have a particle size of from about 1 nm to about 10 μm, but may not be limited thereto. For example, the ceramic particles in the matrix ceramic may have a particle size of from about 1 nm to about 10 μm, from about 10 nm to about 10 μm, from about 100 nm to about 10 μm, from about 500 nm to about 10 μm, from about 1 μm to about 10 μm, from about 1 nm to about 1 μm, from about 10 nm to about 1 μm, from about 100 nm to about 1 μm, from about 500 nm to about 1 μm, from about 1 nm to about 500 nm, from about 10 nm to about 500 nm, from about 100 nm to about 500 nm, from about 1 nm to about 100 nm, from about 10 nm to about 100 nm, or from about 1 nm to about 10 nm, but may not be limited thereto.

A second aspect of the present disclosure provides a hexagonal boron nitride nanosheet/ceramic nanocomposite material formed by using the hexagonal boron nitride nanosheet/ceramic nanocomposite powder according to the first aspect of the present disclosure.

Figure 2:
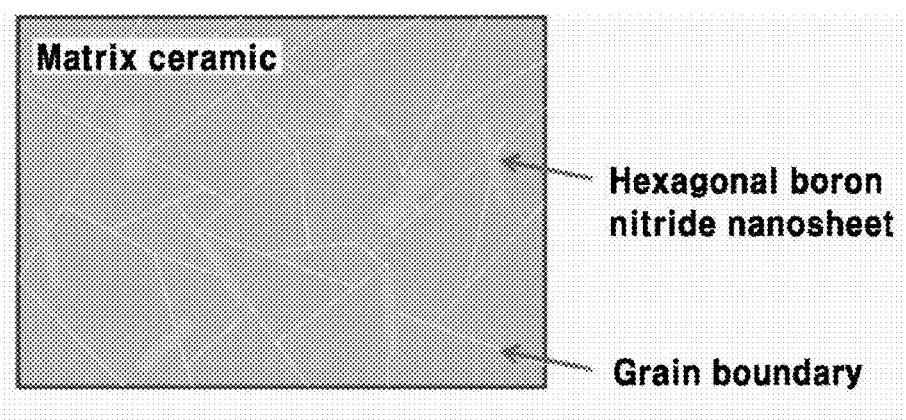
FIG. 2 is a schematic view showing a structure of a hexagonal boron nitride nanosheet/ceramic nanocomposite material in accordance with an illustrative embodiment of the present disclosure.

FIG. 2 is a schematic view showing a structure of a hexagonal boron nitride nanosheet/ceramic nanocomposite material in accordance with an illustrative embodiment of the present disclosure. As illustrated in FIG. 2, the hexagonal boron nitride nanosheets may be uniformly included in a form of a thin film between the ceramic particles in the matrix ceramic or on the surface of the matrix ceramic to be bonded to the ceramic particles, but may not be limited thereto.

In accordance with an illustrative embodiment of the present disclosure, the hexagonal boron nitride nanosheet/ceramic nanocomposite material may be produced by forming a bulk material through sintering of the hexagonal boron nitride nanosheet/ceramic nanocomposite powders, but may not be limited thereto. For example, the sintering may include a normal sintering, a reaction sintering, a pressure sintering, an equal pressure sintering, a gas pressure sintering, an atmosphere pressure sintering, or a high temperature pressure sintering, but may not be limited thereto.

In accordance with an illustrative embodiment of the present disclosure, sintering the hexagonal boron nitride nanosheet/ceramic nanocomposite powder may be performed at a temperature of from about 50% to about 80% of the melting point of the matrix ceramic, but may not be limited thereto. For example, the sintering may be performed at a temperature of from about 50% to about 80%, from about 60% to about 80%, from about 70% to about 80%, from about 50% to about 70%, from about 60% to about 70%, or from about 50% to about 60% of the melting point of the matrix ceramic, but may not be limited thereto.

A third aspect of the present disclosure provides a method for producing hexagonal boron nitride nanosheet/ceramic nanocomposite powder including modifying a surface of a hexagonal boron nitride nanosheet by covalent or non-covalent functionalization of the surface of the hexagonal boron nitride nanosheet; adding powder of a matrix ceramic in a solvent which the hexagonal boron nitride nanosheets are dispersed, to be dispersed therein; and removing the solvent.

Figure 3:
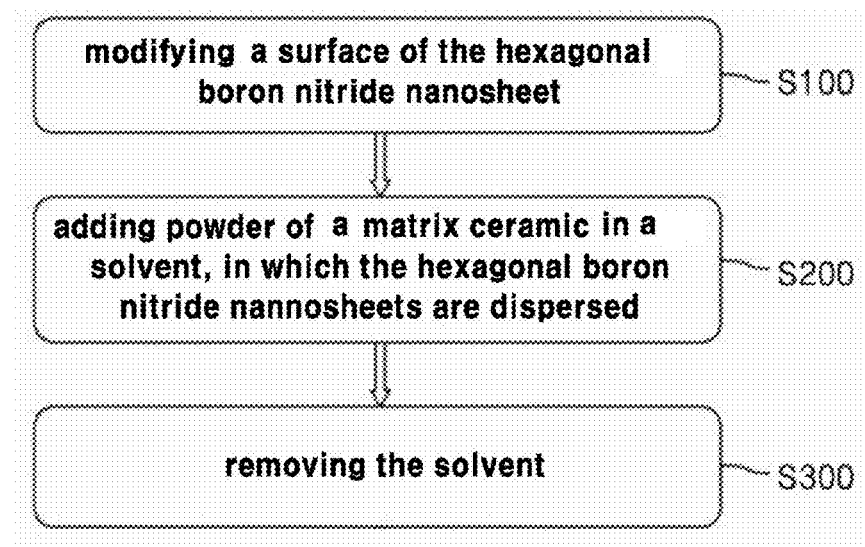
FIG. 3 is a flow chart showing a method for producing hexagonal boron nitride nanosheet/ceramic nanocomposite powder in accordance with an illustrative embodiment of the present disclosure.

FIG. 3 is a flow chart showing a method for producing hexagonal boron nitride nanosheet/ceramic nanocomposite powder in accordance with an illustrative embodiment of the present disclosure. As illustrated in FIG. 3, the method for producing the hexagonal boron nitride nanosheet/ceramic nanocomposite powder in accordance with the third aspect of the present disclosure includes: modifying surfaces of hexagonal boron nitride nanosheets (S100); adding powder of a matrix ceramic into a solvent, in which the hexagonal boron nitride nanosheets are dispersed, to be dispersed therein (S200); and removing the solvent (S300).

First, hexagonal boron nitride nanosheets are produced. In accordance with an illustrative embodiment of the present disclosure, the hexagonal boron nitride nanosheets may be produced by a method selected from the group consisting of a mechanical exfoliation, an ultrasonification treatment, a ball-milling, a centrifugation, a chemical vapor deposition, a boron nitride interlayer compound method, a multi-component low temperature eutectic temperature system, and combinations thereof, but may not be limited thereto.

Subsequently, according to the flow chart of FIG. 3, the surfaces of the hexagonal boron nitride nanosheets are modified (S100). In accordance with an illustrative embodiment of the present disclosure, the surface of the hexagonal boron nitride nanosheet may be modified by covalent or non-covalent functionalization of the surface of the hexagonal boron nitride nanosheet, but may not be limited thereto. For example, the covalent functionalization used for the surface modification of the hexagonal boron nitride nanosheet may include hydroxyl functionalization, ether functionalization, carbonyl functionalization, ketone functionalization, ester functionalization, aldehyde functionalization, carboxy functionalization, amino functionalization, nitro functionalization, or alkyl functionalization, but may not be limited thereto. For example, the non-covalent functionalization may be performed by π-stacking or Van der Walls bonding between the hexagonal boron nitride nanosheets and a polymer or organic material, but may not be limited thereto. For example, the polymer may include an aromatic hexagonal ring or an aromatic pentagonal ring, but may not be limited thereto. The polymer including the aromatic hexagonal ring or the aromatic pentagonal ring may be, for example, a polymer including an aromatic hexagonal ring or an aromatic pentagonal ring selected from the group consisting of polyaryleneethynylene, poly(3-decylthiophene), polyphenylenesulfide, polysulfone, polybenzimidazole, polystyrenesulfonate, polyethyleneether, polyethersulfone, polyetherketone, polyimide, and combinations thereof, but may not be limited thereto. For example, the organic material may include a compound including an aromatic hexagonal ring or an aromatic pentagonal ring, but may not be limited thereto. For example, the organic material including the aromatic hexagonal ring or the aromatic pentagonal ring may include a compound including an aromatic hexagonal ring or an aromatic pentagonal ring selected from the group consisting of benzene, pyrene, pyridine, porphyrin, quinoline, isoquinoline, pyridazine, pyrimidine, pyrazine, cytosine, uracil, furan, pyrrole, thiophene, melamine, aminopyrene, benzyl benzoate, and combinations thereof, but may not be limited thereto.

In accordance with an illustrative embodiment of the present disclosure, the process for the surface modification of the hexagonal boron nitride nanosheet may be performed simultaneously with or separately from the process for producing the hexagonal boron nitride nanosheet. For example, if the producing process and the surface modification process are performed at the same time, the hexagonal boron nitride nanosheets may be produced through addition of the organic material in the ball-milling process, and simultaneously, the non-covalent functionalization may be performed, without being limited thereto.

Subsequently, the powder of the matrix ceramic are added to and dispersed in a solvent in which the hexagonal boron nitride nanosheets are dispersed (S200).

In accordance with an illustrative embodiment of the present disclosure, for the solvent, any solvent that can uniformly disperse the surface-modified hexagonal boron nitride nanosheets can be used without limitation. The solvent may include an organic or inorganic solvent, but may not be limited thereto. For example, the solvent may include a member selected from the group consisting of chloroform ($CHCl_3$), chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, chlorobenzene, chloroform, cyclohexane, cyclohexanol, decalin, dibromethane, diethylene glycol, diethylene glycol ether, diethyl ether, diglyme, dimethoxymethine, N,N-dimethylformamide, ethanol, ethylamine, ethylbenzene, ethyleneglycolether, ethyleneglycol, ethyleneoxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylene diamine, thiopen, toluene, 1,2,4-trichlorobenzne, 1,1,1-trichloroethane, 1,1,2-trichloroethane, trichloroethylene, triethylamine, triethylenechlirolether, 1,3,5-trimethylbenzene, m-xylene, o-xylene, p-xylene, 1,2-dichlorobenzene, 1,3-dichlorobenzne, 1,4-dichlorobenzene, and combinations thereof, but may not be limited thereto. In addition, for the method for dispersing the hexagonal boron nitride nanosheets, any method that enables the hexagonal boron nitride nanosheets to be uniformly dispersed in the solvent may be used without limitation. For example, the method for dispersing the hexagonal boron nitride nanosheets may be performed by an ultrasonication or stirring, but may not be limited thereto.

Subsequently, the powder of the matrix ceramic are added to and dispersed in the solvent, in which the hexagonal boron nitride nanosheets are dispersed. In this case, an amount of the powder of the matrix ceramic can be controlled in comparison with the amount of the hexagonal boron nitride nanosheets dispersed in the solvent. Controlling the amount of the powder of the matrix ceramic may be intended to prevent the hexagonal boron nitride nanosheets from being aggregated with one another, when removing the solvent in a follow-up process. In accordance with an illustrative embodiment of the present disclosure, the powder of the matrix ceramic may include an inorganic material selected from the group consisting of oxides, carbides, nitrides, borides, and combinations thereof, but may not be limited thereto. For example, if the matrix ceramic is oxide, it may include at least a member selected from the group consisting of $Al_2O_3$, $SiO_2$, $TiO_2$, $ZrO_2$, $Ta_2O_5$, MgO, BeO, $BaTiO_3$, ZnO, BaO, $CrO_2$, $Y_2O_3$, $SnO_2$, $WO_2$, $W_2O_3$, $WO_3$, and combinations thereof, but may not be limited thereto. For example, if the matrix ceramic is carbide, it may include a member selected from the group consisting of SiC, TiC, ZrC, HfC, VC, NbC, TaC, $Mo_2C$, WC, yttrium carbide, and combinations thereof, but may not be limited thereto. For example, if the matrix ceramic is nitride, it may include a member selected from the group consisting of TiN, ZrN, HfN, VN, NbN, TaN, AlN, AlON, $Si_3N_4$, yttrium nitride, and combinations thereof, but may not be limited thereto. For example, if the matrix ceramic is boride, it may include a member selected from the group consisting of $TiB_2$, $ZrB_2$, $HfB_2$, $VB_2$, $NbB_2$, $TaB_2$, $WB_2$, $MoB_2$, $B_4C$, $LaB_6$, and combinations thereof, but may not be limited thereto.

In accordance with an illustrative embodiment of the present disclosure, it is possible to further include adding a surfactant upon adding the powder of the matrix ceramic, but may not be limited thereto. For the surfactant, any surfactant that enables the hexagonal boron nitride nanosheets to be uniformly dispersed in the solvent can be used without limitation. The surfactant may include a member selected from the group consisting of an anion surfactant, a cation surfactant, an amphoteric surfactant, a nonionic surfactant, and combinations thereof, but may not be limited thereto. The surfactant, for example, may include a member selected from the group consisting of tetradecyltrimethylammonium bromide (TTAB), cetyl trimethyl ammonium bromide (CTAB), sodium lauryl sulfate (SLS), sodium dodecyl sulfate (SDS), benzalkonium chloride, and combinations thereof, but may not be limited thereto. For example, when silicon nitride ($Si_3N_4$) powder is dispersed in distilled water, cetyl trimethyl ammonium bromide (CTAB) may be used as the surfactant, but may not be limited thereto. In this case, in order to uniformly disperse the powder of the matrix ceramic, an amount of the surfactant can be controlled. For example, the amount of the surfactant may be controlled to be about 1 wt % of the powder of the matrix ceramic, but may not be limited thereto. In addition, for the method for dispersing the powder of the matrix ceramic, any method that enables the hexagonal boron nitride nanosheets to be uniformly dispersed in the solvent can be used without limitation. For example, the method for dispersing the powder of the matrix ceramic may be conducted by an ultrasonification or stirring, but may not be limited thereto.

Subsequently, the solvent is removed (S300). By removing the solvent, in which the hexagonal boron nitride nanosheets and the powder of the matrix ceramic are uniformly dispersed, it is possible to form the hexagonal boron nitride nanosheet/ceramic nanocomposite powder including ceramic particles of the matrix ceramic and the hexagonal boron nitride nanosheets dispersed as a reinforcing agent for the matrix ceramic. In this case, removing the solvent may be performed by a heat treatment, drying, filtering, etc., but may not be limited thereto.

In accordance with an illustrative embodiment of the present disclosure, an amount of the hexagonal boron nitride nanosheets dispersed in the hexagonal boron nitride nanosheet/ceramic nanocomposite powder may be from above about 0 vol % to about 50 vol % or less, but may not be limited thereto. For example, the amount of the hexagonal boron nitride nanosheets dispersed in the hexagonal boron nitride nanosheet/ceramic nanocomposite powder may be about 50 vol % or less, about 45 vol % or less, about 40 vol % or less, about 35 vol % or less, about 30 vol % or less, about 25 vol % or less, about 20 vol % or less, about 15 vol % or less, about 10 vol % or less, about 5 vol % or less, or about 1 vol % or less, but may not be limited thereto. For example, if the amount of the hexagonal boron nitride nanosheets exceeds about 50 vol %, the structure of the hexagonal boron nitride nanosheets may be transformed into hexagonal boron nitride due to condensation of the hexagonal boron nitride nanosheets. The transformation of the structure of the hexagonal boron nitride nanosheets would deteriorate the function of the hexagonal boron nitride nanosheets that are homogeneously mixed with the ceramic particles within the hexagonal boron nitride nanosheet/ceramic nanocomposite powder to improve the mechanical properties of the matrix ceramic.

A fourth aspect of the present disclosure provides a method for producing a hexagonal boron nitride nanosheet/ceramic nanocomposite material, including sintering the hexagonal boron nitride nanosheet/ceramic nanocomposite powder produced by the method according to the third aspect of the present disclosure.

In accordance with an illustrative embodiment of the present disclosure, the hexagonal boron nitride nanosheet/ceramic nanocomposite material can be produced by forming bulk material through the process of sintering the hexagonal boron nitride nanosheet/ceramic nanocomposite powder. For example, the sintering may include normal sintering, reaction sintering, pressure sintering, equal pressure sintering, gas pressure sintering, atmosphere pressure sintering, or high temperature pressure sintering, and be conducted by hot pressing (HP), hot isostatic pressing (HIP), spark plasma sintering (SPS), cold isostatic pressing (CIP), hydraulic pressing, etc., but may not be limited thereto.

In accordance with an illustrative embodiment of the present disclosure, sintering the hexagonal boron nitride nanosheet/ceramic nanocomposite powder may be performed at a temperature of from about 50% to about 80% of the melting point of the matrix ceramic, but may not be limited thereto. For example, the sintering may be performed at a temperature of from about 50% to about 80%, from about 60% to about 80%, from about 70% to about 80%, from about 50% to about 70%, from about 60% to about 70%, or from about 50% to about 60% of the melting point of the matrix ceramic, but may not be limited thereto.

Hereinafter, examples of the present disclosure are described in detail. However, the present disclosure is not limited thereto.

Example 1: Production of Hexagonal Boron Nitride Nanosheet/Alumina Nanocomposite Powders Functionalized with PBA About 0.2 g of hexagonal boron nitride and about 200 mg of 1-pyrenebutric acid (PBA) were added to about 500 mL of isopropyl alcohol (1-propanol, IPA) and ultrasonified for about 10 hours. As a result of the ultrasonification, the hexagonal boron nitride was exfoliated to be hexagonal boron nitride nanosheets, and the hexagonal boron nitride nanosheets were functionalized by using PBA. The hexagonal boron nitride nanosheets functionalized with PBA were uniformly dispersed in the IPA solution. About 20 g of alumina ($Al_2O_3$) powder, and as a surfactant, about 0.02 g of sodium dodecyl sulfate (SDS), which corresponds to about 0.1 wt % of the alumina powder, were added to the solution and ultrasonified for about 6 hours. Thereafter, the solvent was removed through vacuum filtering to form hexagonal boron nitride nanosheet/alumina nanocomposite powder functionalized with PBA. The hexagonal boron nitride nanosheet/alumina nanocomposite powder functionalized with PBA were produced to include about 1 wt % of the hexagonal boron nitride nanosheets.

Figure 4:
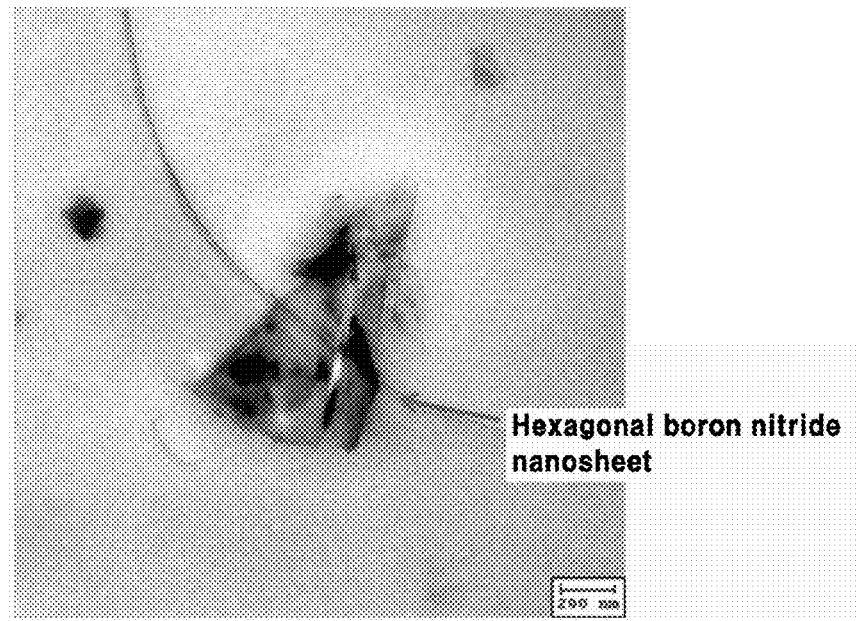
FIG. 4 is a transmittance electron microscope (TEM) photograph of a surface-modified hexagonal boron nitride nanosheet in accordance with an example of the present disclosure.

FIG. 4 is a transmittance electron microscope (TEM) photograph of the hexagonal boron nitride nanosheets functionalized with PBA as produced through ultrasonification in accordance with Example 1 of the present disclosure. The produced hexagonal boron nitride nanosheets each has an area around 1 μm.

Example 2: Production of Hexagonal Boron Nitride Nanosheet/Alumina Nanocomposite Powders Functionalized with PSS About 2 g of hexagonal boron nitride and about 0.1 g of polystyrene sodium sulfonate (PSS) were added to about 30 mL IPA and made as a slurry. The slurry was subject to high energy ball-milling at about 200 rpm for about 15 hours, using a steel ball. In this process, the hexagonal boron nitride was exfoliated by the ball-milling energy to be hexagonal boron nitride nanosheets and functionalized with PSS. The hexagonal boron nitride nanosheet slurry functionalized with PSS was centrifuged at about 3,000 rpm for about 15 minutes to remove sunken materials and filter the solution so that hexagonal boron nitride nanosheets functionalized with PSS were obtained. About 0.2 g of the hexagonal boron nitride nanosheets functionalized with PSS was added to distilled water and ultrasonified for about 5 hours so that a distilled water solution, in which the hexagonal boron nitride nanosheets functionalized with PSS were uniformly dispersed, was obtained. About 20 g of alumina powder was added to the solution and ultrasonified for about 6 hours. Thereafter, the solvent was removed through stirring to form hexagonal boron nitride nanosheet/alumina nanocomposite powder functionalized with PSS. The hexagonal boron nitride nanosheet/alumina nanocomposite powder functionalized with PSS were produced to include about 1 wt % of the hexagonal boron nitride nanosheets.

Figure 5:
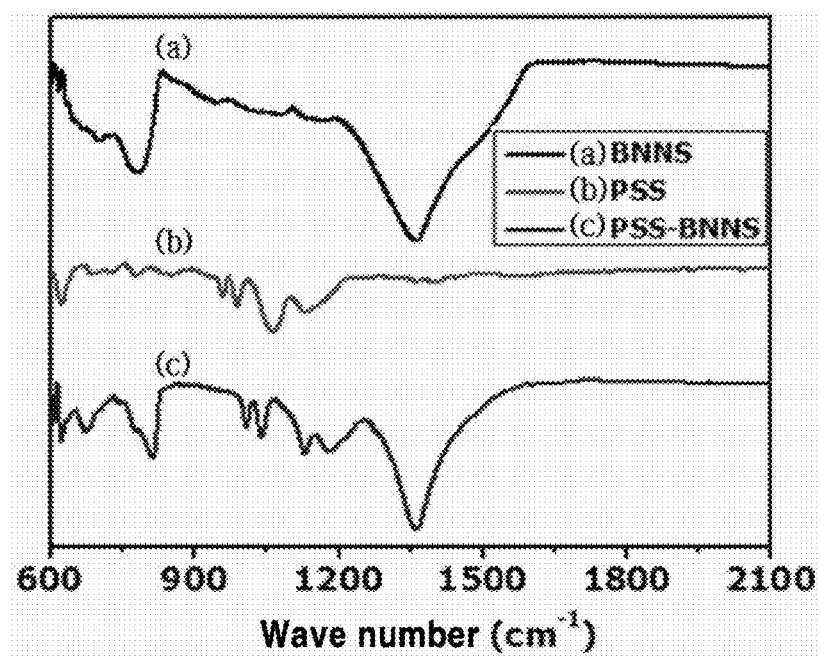
FIG. 5 provides Fourier transform infrared spectroscopy (FT-IR) measurement results of surface-modified hexagonal boron nitride nanosheets in accordance with an example of the present disclosure.

FIG. 5 provides infrared spectroscopy measurement results for the hexagonal boron nitride nanosheets functionalized with PSS in accordance with Example 2 of the present disclosure. In FIG. 5, the line (a) indicates pure hexagonal boron nitride nanosheets, the line (b) indicates pure PSS, and the line (c) indicates the hexagonal boron nitride nanosheets functionalized with PSS. From FIG. 5, it was identified that the hexagonal boron nitride nanosheets functionalized with PSS were formed in the manner that pure PSS is attached to pure hexagonal boron nitride nanosheets.

Figure 6:
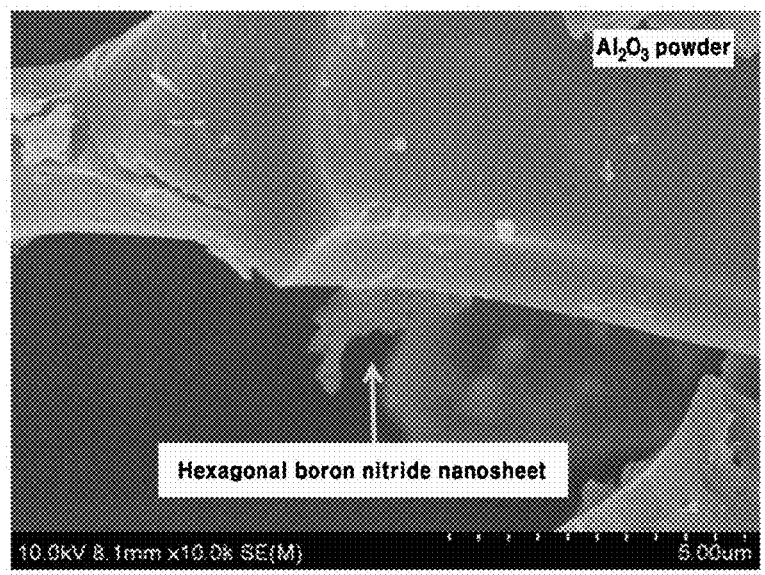
FIG. 6 is a scanning electron microscope (SEM) photograph of hexagonal boron nitride nanosheet/alumina nanocomposite powder in accordance with an example of the present disclosure.

FIG. 6 is a scanning electron microscope (SEM) photograph of the hexagonal boron nitride nanosheet/alumina nanocomposite powder functionalized with PSS in accordance with Example 2 of the present disclosure. It was identified that hexagonal boron nitride nanosheets were attached to alumina powder.

Example 3: Production of Hexagonal Boron Nitride Nanosheet/Alumina Nanocomposite Material A spark plasma sintering (SPS) process was used to form a hexagonal boron nitride nanosheet/alumina nanocomposite material (sintered material) by using the hexagonal boron nitride nanosheet/alumina nanocomposite powder of Example 2. The reason for proceeding with the SPS process is that SPS process has features such as rapid temperature elevation, fast sintering progress, vacuum atmosphere, etc. In order to proceed with the sintering, a carbon mold having a size of about 13π was prepared. In order to prevent carbons of the mold from being diffused into the materials at high temperature, a boron nitride (BN) spray was applied. After a temperature was elevated to about 1,400° C. at a velocity of about 100° C. per minute under vacuum atmosphere, the temperature was maintained at 1,400° C. for about 10 minutes to proceed with the sintering. About 50 MPa pressure was applied. After the sintering was finished, a carbon diffusion layer on the surface of the hexagonal boron nitride nanosheet/alumina nanocomposite material was removed by using sandpapers. The hexagonal boron nitride nanosheet/alumina nanocomposite material included about 1 wt % of the hexagonal boron nitride nanosheets as in the hexagonal boron nitride nanosheet/alumina nanocomposite powder of Example 2.

Figure 7:
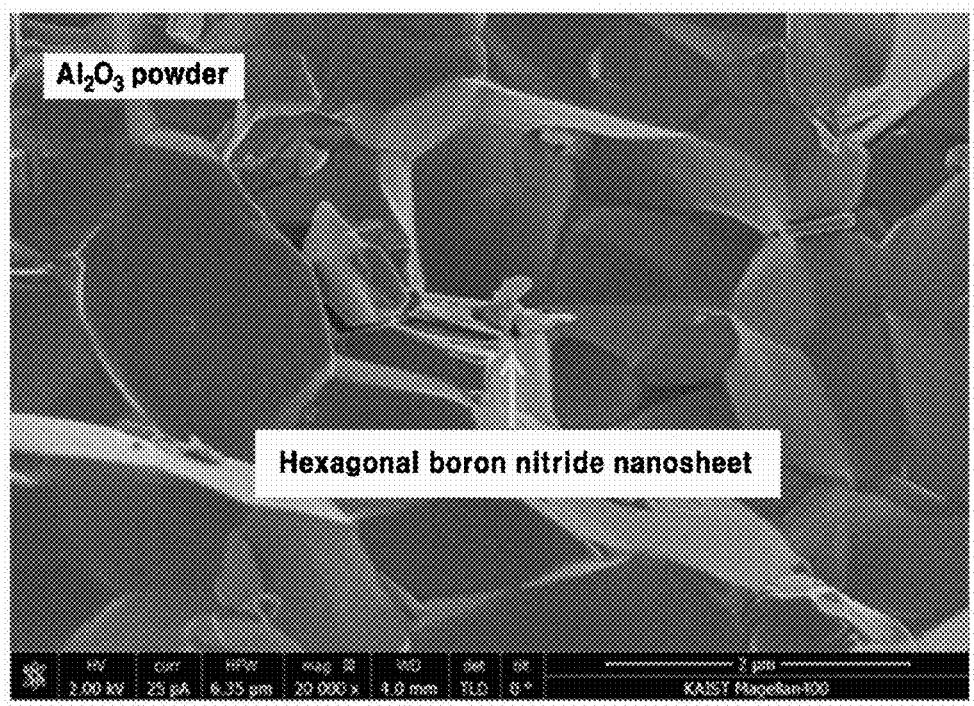
FIG. 7 is a scanning electron microscope (SEM) photograph of a hexagonal boron nitride nanosheet/alumina nanocomposite material in accordance with an example of the present disclosure.

FIG. 7 is a scanning electron microscope (SEM) photograph of the hexagonal boron nitride nanosheet/alumina nanocomposite material sintered by the SPS process in accordance with Example 3 of the present disclosure. It was identified that the hexagonal boron nitride nanosheets were uniformly dispersed in the alumina matrix.

Figure 9A:
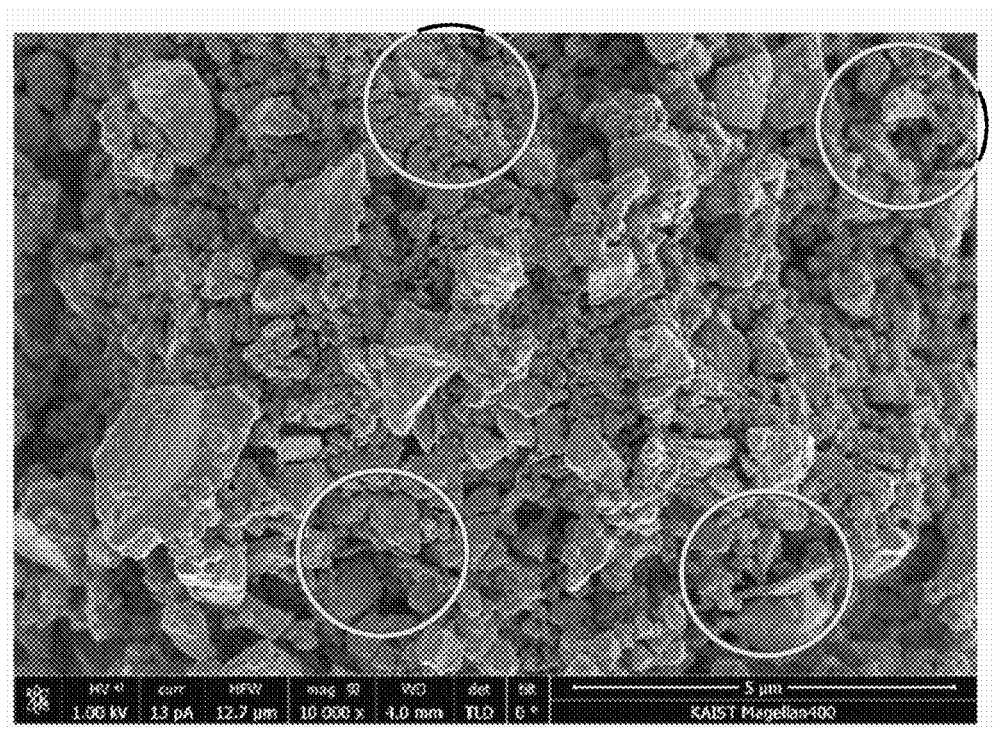
FIGS. 9A and 9B are scanning electron microscope (SEM) photographs showing a hexagonal boron nitride nanosheet/silicon nitride nanocomposite powder in accordance with an example of the present disclosure.
Figure 9B:
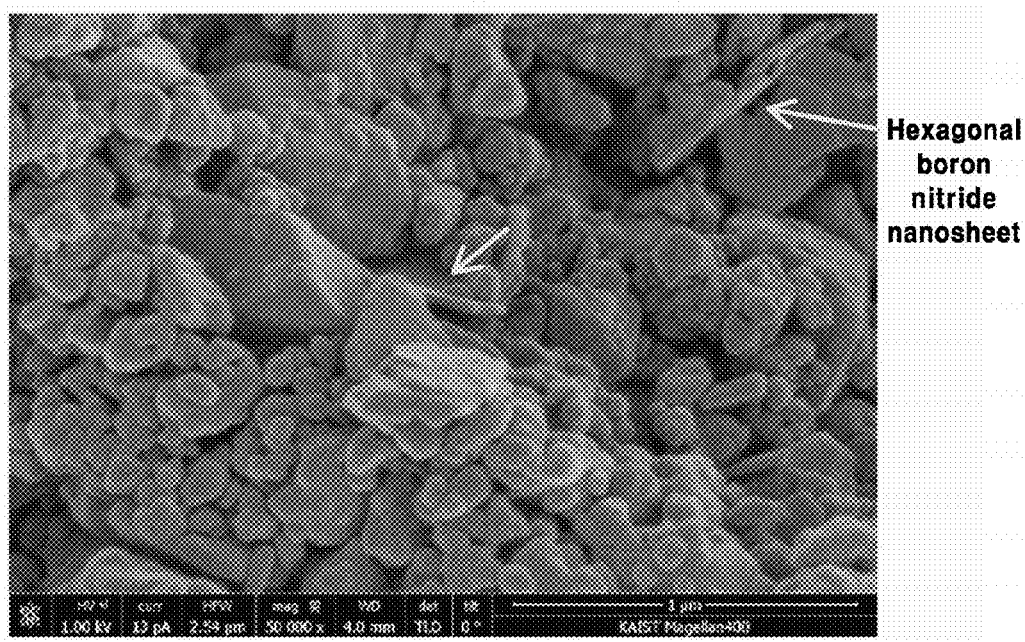
Figure 10A:
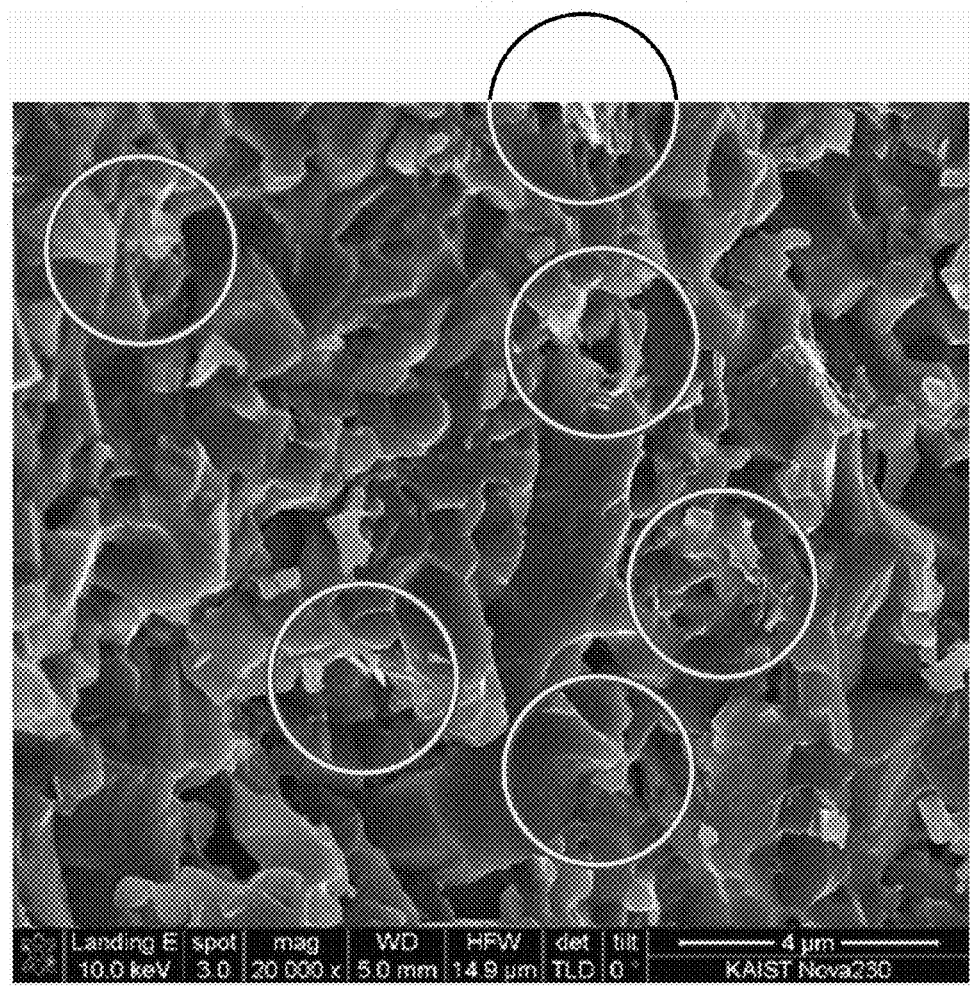
FIGS. 10A and 10B are scanning electron microscope (SEM) photographs showing a hexagonal boron nitride nanosheet/silicon nitride nanocomposite material in accordance with an example of the present disclosure.
Figure 10B:
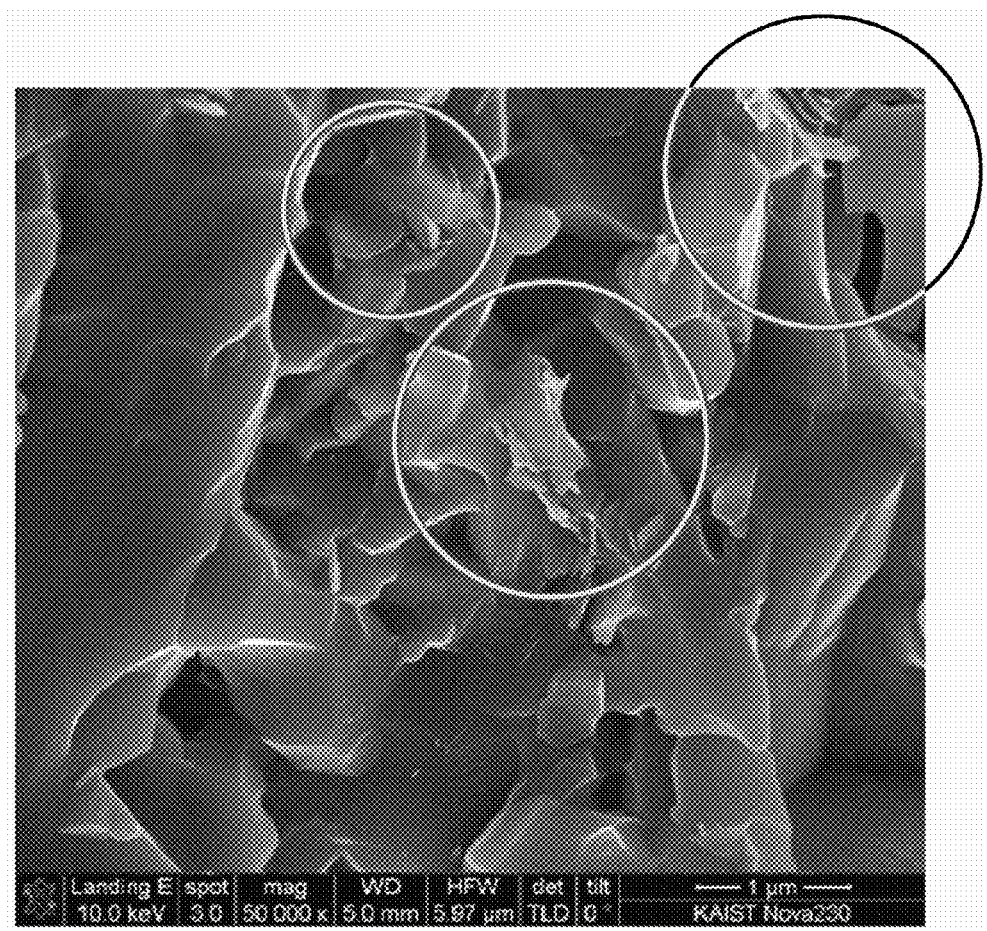

Example 4: Production of Hexagonal Boron Nitride Nanosheet/Silicon Nitride ($Si_3N_4$) Nanocomposite Material First, using the same method of Examples 2 and 3, except using silicon nitride as matrix ceramic material, hexagonal boron nitride nanosheet/silicon nitride nanocomposite powder was produced, and then, the powder was sintered to produce hexagonal boron nitride nanosheet/silicon nitride nanocomposite material (sintered material). FIGS. 9A and 9B are scanning electron microscope (SEM) photographs of the produced hexagonal boron nitride nanosheet/silicon nitride nanocomposite powder. FIGS. 10A and 10B are scanning electron microscope (SEM) photographs of the produced hexagonal boron nitride nanosheet/silicon nitride nanocomposite material. From the results, it was identified that the hexagonal boron nitride nanosheets were uniformly dispersed in the silicon nitride matrix.

Analyses

Figure 8A:
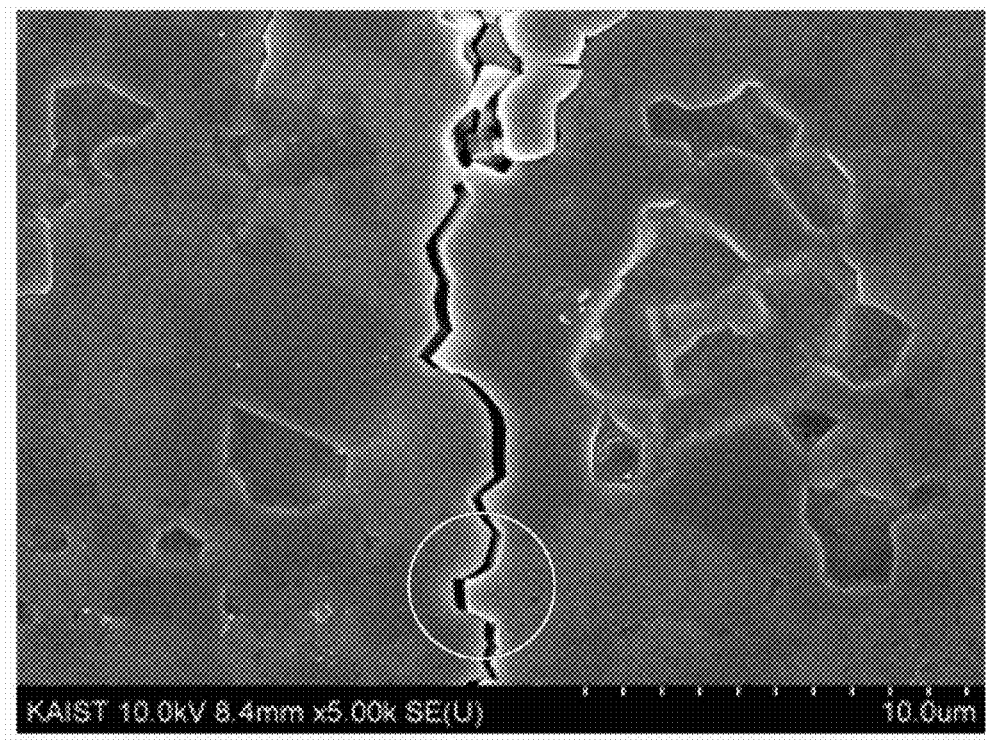
FIGS. 8A and 8B are scanning electron microscope (SEM) photographs showing cracks of a hexagonal boron nitride nanosheet/alumina nanocomposite material through an indentation method in accordance with an example of the present disclosure.
Figure 8B:
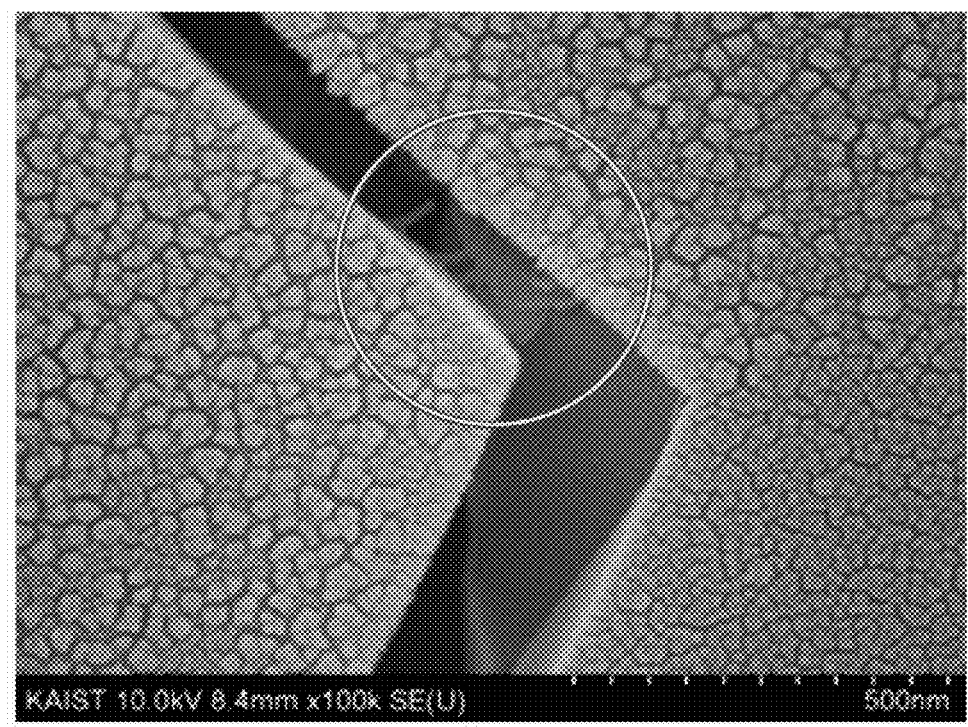

The Vickers indentation method was used to measure a fracture toughness value for the hexagonal boron nitride nanosheet/alumina nanocomposite material produced in Example 3. The Vickers indentation method was performed at about 19.6 kN for about 10 seconds by using a diamond tip. Length of a crack was measured by an optical microscope. Pure alumina, to which nothing was added, exhibited the fracture toughness value of about 4.26 MPa·m$^{0.5}$, while the nanocomposite material, to which about 3 vol % of the hexagonal boron nitride nanosheets were added, exhibited the fracture toughness value of about 9.57 MPa·m$^{0.5}$, which is improved about 2.25 times that of the pure alumina. It was identified that the hexagonal boron nitride nanosheets greatly affect the improvement of the fracture toughness of the ceramic material. FIGS. 8A and 8B are scanning electron microscope (SEM) photographs of the hexagonal boron nitride nanosheet/alumina nanocomposite material, which were cracked through the indentation method, in accordance with Example 3 of the present disclosure. From FIG. 8A, it was identified that the cracks spread in a zigzag form. It was identified that the added hexagonal boron nitride nanosheets prevent the spreading of the cracks. In addition, FIG. 8B is a scanning electron microscope image obtained by enlarging the red circle part of FIG. 8A about 50,000 times. From FIG. 8B, it was identified that the hexagonal boron nitride bridged the cracks.

Figure 11A:
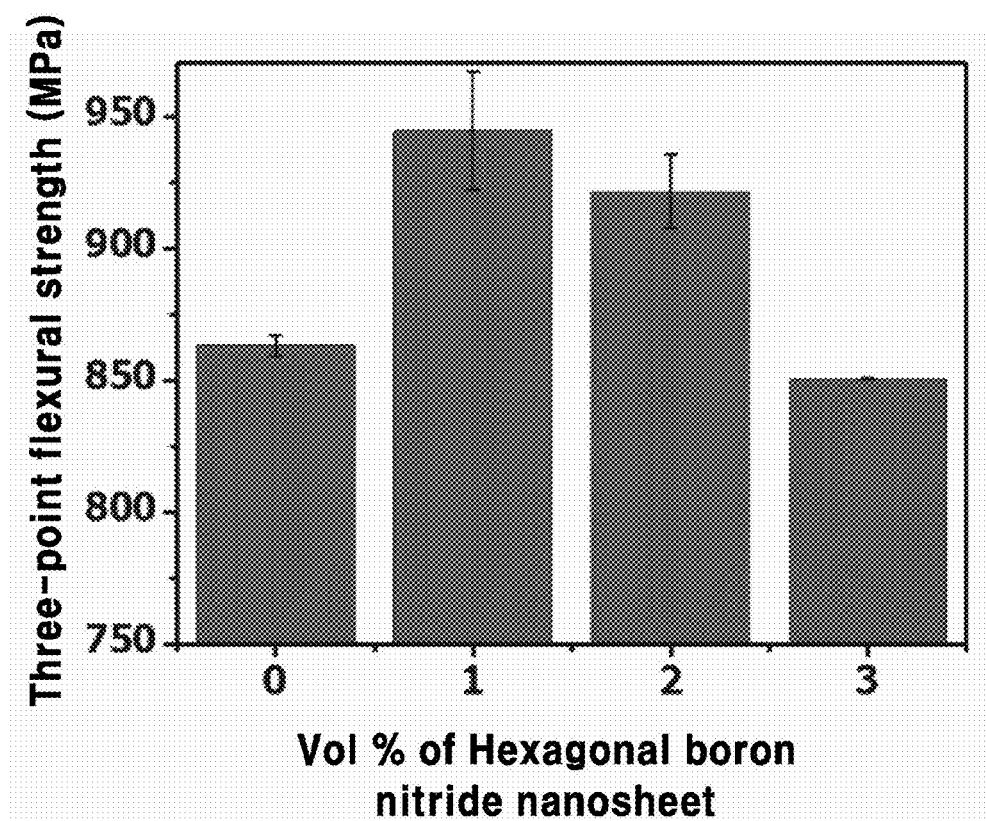
FIGS. 11A and 11B are graphs of mechanical characteristic experiment results of a hexagonal boron nitride nanosheet/silicon nitride nanocomposite material in accordance with an example of the present disclosure.
Figure 11B:
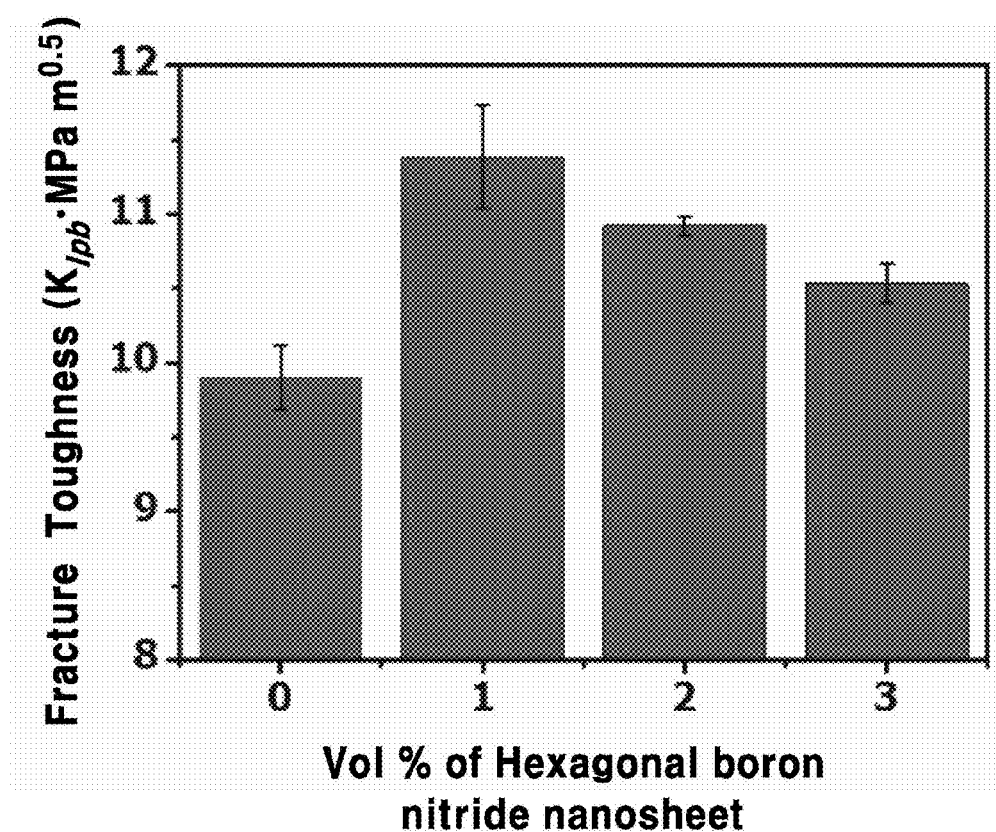

Also, as a mechanical characteristic experiment of the hexagonal boron nitride nanosheet/silicon nitride nanocomposite material produced by Example 4, a three-point flexural strength test and fracture toughness test were performed, and each of FIGS. 11A and 11B is the result thereof. In the three-point flexural strength test, the strength was increased by about 8.6% when 1 vol % of the hexagonal boron nitride nanosheet was added. In the fracture toughness test, the fracture toughness was increased by about 15% when 1 vol % of the hexagonal boron nitride nanosheet was added.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A method for producing hexagonal boron nitride nanosheet/ceramic nanocomposite powder, comprising:
   modifying a surface of a hexagonal boron nitride nanosheet by covalent or non-covalent functionalization of the surface of the hexagonal boron nitride nanosheet, wherein the non-covalent functionalization is performed by π-stacking or Van der Walls bonding between the hexagonal boron nitride nanosheet and an organic material, and wherein the organic material is a monomeric compound that includes an aromatic hexagonal ring or an aromatic pentagonal ring selected from the group consisting of benzene, pyrene, pyridine, porphyrin, quinoline, isoquinoline, pyridazine, pyrimidine, pyrazine, cytosine, uracil, furan, pyrrole, thiophene, melamine, aminopyrene, benzyl benzoate, and combinations thereof;
   dispersing the surface-modified hexagonal boron nitride nanosheet into a solvent;
   adding powder of a matrix ceramic in the solvent in which the hexagonal boron nitride nanosheets are dispersed, to be dispersed therein;
   adding a surfactant upon adding the powder of the matrix ceramic, wherein the surfactant includes a member selected from the group consisting of tetradecyltrimethylammonium bromide (TTAB), cetyl trimethyl ammonium bromide (CTAB), sodium lauryl sulfate (SLS), sodium dodecyl sulfate (SDS), benzalkonium chloride, and combinations thereof; and
   removing the solvent,
   wherein the amount of the hexagonal boron nitride nanosheets dispersed in the hexagonal boron nitride nanosheet/ceramic nanocomposite powder is from above about 0 vol % to about 50 vol % or less.

2. The method for producing hexagonal boron nitride nanosheet/ceramic nanocomposite powder of claim 1,
   wherein the hexagonal boron nitride nanosheet is produced by a method selected from the group consisting of mechanical exfoliation, ultrasonification, ball-milling, centrifugation, chemical vapor deposition, boron nitride interlayer compound method, multi-component low temperature eutectic system, and combinations thereof.

3. The method for producing hexagonal boron nitride nanosheet/ceramic nanocomposite powder of claim 1,
   wherein additional surface modification of the hexagonal boron nitride nanosheet by the non-covalent functionalization is performed by π-stacking or Van der Walls bonding between the hexagonal boron nitride nanosheet and a polymer.

4. The method for producing hexagonal boron nitride nanosheet/ceramic nanocomposite powder of claim 3,
   wherein the polymer includes an aromatic hexagonal ring or aromatic pentagonal ring.

5. The method for producing hexagonal boron nitride nanosheet/ceramic nanocomposite powder of claim 1,
   wherein the matrix ceramic powder includes an inorganic material selected from the group consisting of oxides, carbides, nitrides, borides, and combinations thereof.

6. A method for producing a hexagonal boron nitride nanosheet/ceramic nanocomposite material, comprising:
   sintering the hexagonal boron nitride nanosheet/ceramic nanocomposite powder produced by the method according to claim 1.

7. The method for producing a hexagonal boron nitride nanosheet/ceramic nanocomposite material of claim 6,
   wherein the sintering of the hexagonal boron nitride nanosheet/ceramic nanocomposite powder is performed at a temperature of from about 50% to about 80% of the melting point of the matrix ceramic.

8. The method for producing hexagonal boron nitride nanosheet/ceramic nanocomposite powder of claim 1, wherein the covalent functionalization of the surface of the hexagonal boron nitride nanosheet includes hydroxyl functionalization, ether functionalization, carbonyl functionalization, ketone functionalization, ester functionalization, aldehyde functionalization, carboxy functionalization, amino functionalization, nitro functionalization, or alkyl functionalization.

* * * * *